(12) United States Patent
Niwa et al.

(10) Patent No.: US 9,195,548 B2
(45) Date of Patent: Nov. 24, 2015

(54) INFORMATION PROCESSING METHOD AND APPARATUS FOR RECOVERING STATE OF SYSTEM

(71) Applicant: FUJITSU LIMITED, Kawasaki-shi, Kanagawa (JP)

(72) Inventors: Hideyuki Niwa, Numazu (JP); Yasuo Ueda, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 13/898,612

(22) Filed: May 21, 2013

(65) Prior Publication Data

US 2014/0006855 A1    Jan. 2, 2014

(30) Foreign Application Priority Data

Jul. 2, 2012    (JP) .................................. 2012-148350

(51) Int. Cl.
*G06F 11/14*    (2006.01)
*G06F 11/16*    (2006.01)

(52) U.S. Cl.
CPC ........ *G06F 11/1469* (2013.01); *G06F 11/1441* (2013.01); *G06F 11/1666* (2013.01)

(58) Field of Classification Search
CPC ............ G06F 11/1469; G06F 11/1666; G06F 11/1441; G06F 9/4418; G06F 1/3228; G06F 1/3243; G06F 1/3246
See application file for complete search history.

(56) References Cited

U.S. PATENT DOCUMENTS

| 5,235,700 | A | 8/1993 | Alaiwan et al. | |
| 7,702,955 | B2 * | 4/2010 | de Almeida et al. | 714/10 |
| 8,250,412 | B2 * | 8/2012 | Cheng et al. | 714/47.1 |
| 8,880,860 | B2 * | 11/2014 | Sartorius et al. | 713/1 |
| 2005/0021919 | A1 * | 1/2005 | Kroening | 711/165 |
| 2012/0210155 | A1 * | 8/2012 | Fleischmann et al. | 713/324 |
| 2013/0145137 | A1 * | 6/2013 | Sartorius et al. | 713/1 |

FOREIGN PATENT DOCUMENTS

| JP | 4-213736 | 8/1992 |
| JP | 11-232146 | 8/1999 |
| JP | 2000-353055 | 12/2000 |

* cited by examiner

*Primary Examiner* — Nadeem Iqbal
(74) *Attorney, Agent, or Firm* — Oblon, McClelland, Maier & Neustadt, L.L.P.

(57) ABSTRACT

A disclosed information processing method is executed by a computer and includes: storing context representing a state of a processor in the computer into a certain area of plural areas included in a memory of the computer, wherein same data is stored in each of the plural areas by memory mirroring; performing a setting to switch a type of the certain area from a type of an area for which the memory mirroring is performed to a type of an area for securing data; and upon detecting that reset of the computer was performed, recovering, by using the computer, the state of the processor by using data stored in the certain area.

8 Claims, 10 Drawing Sheets

INFORMATION PROCESSING METHOD AND APPARATUS FOR RECOVERING STATE OF SYSTEM

CROSS-REFERENCE TO RELATED APPLICATIONS

This application is based upon and claims the benefit of priority of the prior Japanese Patent Application No. 2012-148350, filed on Jul. 2, 2012, the entire contents of which are incorporated herein by reference.

FIELD

This invention relates to a technique for recovering a state of a system.

BACKGROUND

A technique is known that a snap shot image of a database using a memory (e.g. in-memory database) is saved in a disk against occurrences of any troubles or the like. However, when a capacity of the memory becomes large, it takes a long time to save the snapshot into the disk. Therefore, the operation of the system may be stopped. Moreover, because it also takes a long time to restore the snap shot from the disk to the memory when any trouble actually occurs, the recovery of the state of the system may be delayed.

Moreover, there is a technique for saving backup data of data on a disk onto another disk. However, the state of the system (e.g. a state of a processor) cannot be recovered only by backing up the data on the disk.

In addition, there is a technique for duplicating the memory, separating one memory when any fault occurs, and gathering damp data from the separated memory. However, an object of this technique is to gather the damp data, and this technique cannot recover the state of the system.

SUMMARY

In other words, there is no conventional art for recovering the state of the system at high speed.

An information processing method relating to one mode of this invention is executed by a computer and includes: (A) storing context representing a state of a processor in the computer into a certain memory area of plural memory areas included in a memory of the computer, wherein same data is stored in each of the plural memory areas by mirroring; (B) performing a setting to switch a type of the certain memory area from a type of a memory area for which the mirroring is performed to a type of an area for securing data; and (C) upon detecting that reset of the computer was performed, recovering, by using the computer, the state of the processor by using data stored in the certain memory area for securing data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
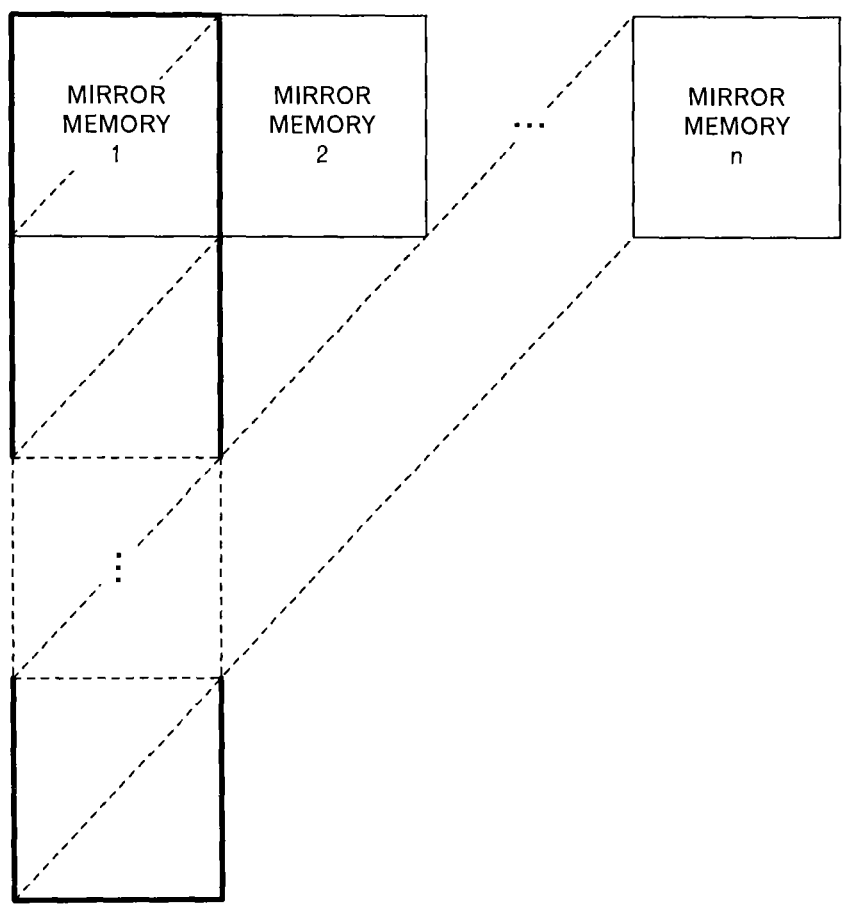
FIG. 1 is a diagram to explain memory division.

FIG. 1 schematically illustrates a memory division in this embodiment. In this embodiment, by dividing a physical memory (a vertically long portion illustrated by a bold line) into n (which is integer equal to or greater than 2) areas, the n areas are used as n mirror memories (mirror memories 1 to n). In FIG. 1, the mirror memories 1 to n are illustrated as being arranged in a horizontal direction, and addresses of the respective mirror memories are set so that the capacity of each mirror memory is the same. However, the capacity of each mirror memory may not be always the same.

Figure 2:
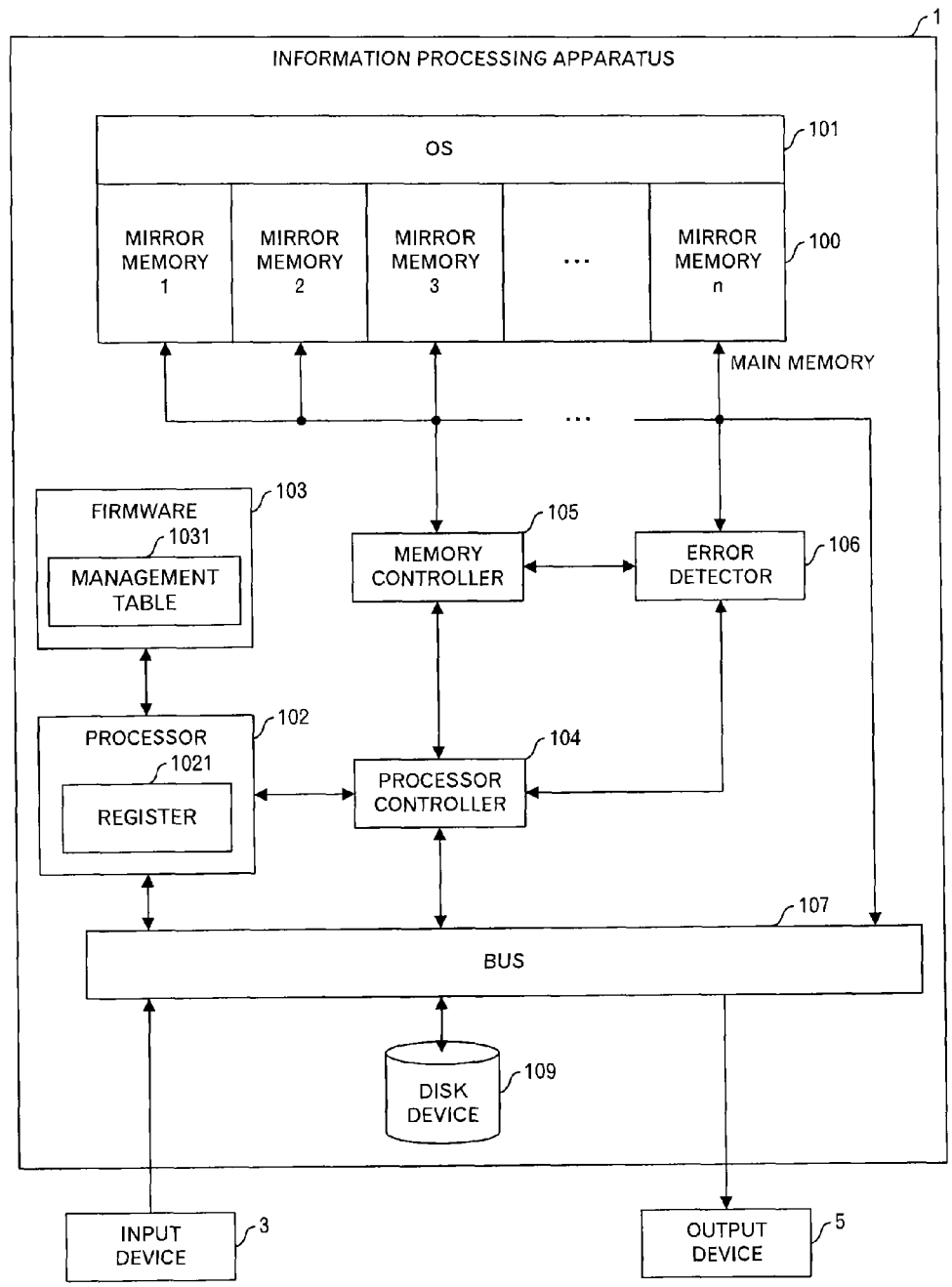
FIG. 2 is a functional block diagram of an information processing apparatus.

FIG. 2 illustrates a functional block diagram of an information processing apparatus 1 in this embodiment. The information processing apparatus 1 includes a main memory 100, which is divided into the mirror memories 1 to n, an Operating System (OS) 101, a processor 102 including a register 1021, a firmware 103 including a management table 1031, a processor controller 104, a memory controller 105, and an error detector 106. Moreover, an input device 3, an output device 5, a disk device 109 storing the OS 101 and the like is also connected with the bus 107 are connected to the information processing apparatus 1 via a bus 107.

While a user of the information processing apparatus 1 watches display contents of the output device 5 such as a monitor, the user operates the input device 3 such as a keyboard to input a division instruction. When accepting the input of the division instruction, the firmware 103 performs a processing for the memory division and the like. When the main memory 100 is operated as a memory mirroring system, the same data is written into each of the mirror memories 1 to n in the main memory 100 in real time. The OS 101 is operating on the main memory 100. The processor 102 reads from and writes data onto the main memory through the bus 107. A register 1021 in the processor 102 stores information representing a state of the processor (e.g. information in a general-purpose register, program counter and stack pointer. Hereinafter, referred to context). When an occurrence of a memory error is detected in the main memory 100, the error detector 106 outputs information concerning the error (e.g. information concerning a portion in which the memory error occurred, information concerning a type of the memory error and the like) to the processor controller 104 and the memory controller 105. The processor controller 104 outputs the information concerning the error to the processor 102. The memory controller 105 performs unmapping of the error memory in which the memory error occurred (i.e. delete a mapping of an address range corresponding to the error memory) to detach the error memory from other mirror memories. Moreover, the memory controller 105 also performs the unmapping of a mirror memory to be used for a stand-by memory.

Next, operations of the information processing apparatus 1 illustrated in FIG. 2 will be explained by using FIGS. 3 to 12. Firstly, the operation performed when starting the memory mirroring will be explained by using FIG. 3.

Figure 3:
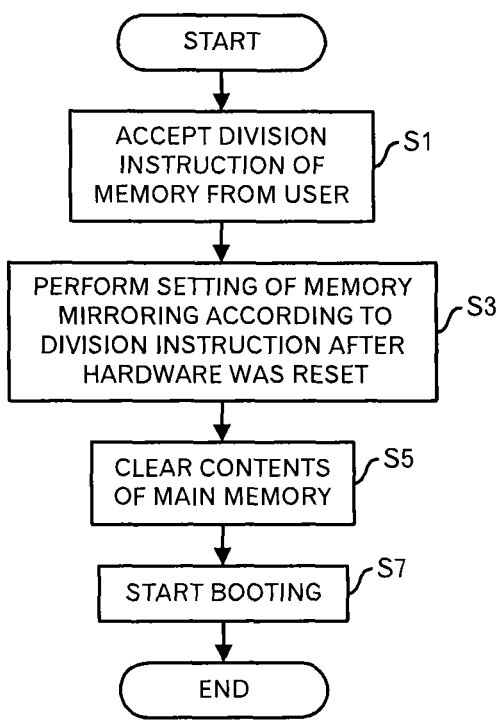
FIG. 3 is a diagram depicting a processing flow of a processing executed when memory mirroring is started.

Firstly, while a user of the information processing apparatus 1 watches a Basic Input/Output System (BIOS) setting screen displayed on the output device 5, the user inputs a division instruction of the physical memory through the input device 3. The division instruction includes the number n of mirror memories, for example. Then, the firmware 103 accepts the input of the division instruction (FIG. 3: step S1).

After that, when the hardware of the information processing apparatus 1 is reset, the firmware 103 performs setting for the memory mirroring according to the division instruction (step S3). More specifically, the firmware 103 outputs the division instruction to the memory controller 105 through the processor controller 104. In response to this, the memory controller 105 performs setting of an address range for each of the mirror memories 1 to n.

The processor controller 104 instructs the memory controller 105 to clear the contents of the main memory 100. In response to this instruction, the memory controller 105 clears the contents of the main memory 100 (step S5).

The processor controller 104 begins booting (step S7). More specifically, the processor controller 104 loads data of the OS 101 onto the main memory 100 to activate the OS 101. Then, the processing ends.

By performing the aforementioned processing, it is possible to appropriately perform the memory mirroring in accordance with the capacity of the main memory 100 and the like.

Next, the operation during the memory mirroring being executed will be explained by using FIGS. 4 and 5.

Figure 4:
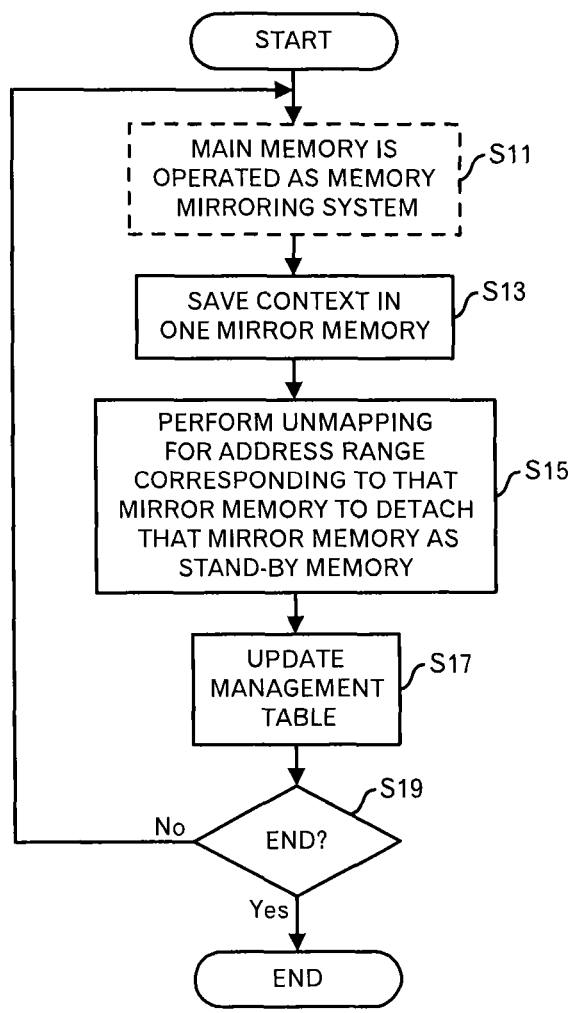
FIG. 4 is a diagram depicting a processing flow of a processing during the execution of the memory mirroring.
Figure 5:
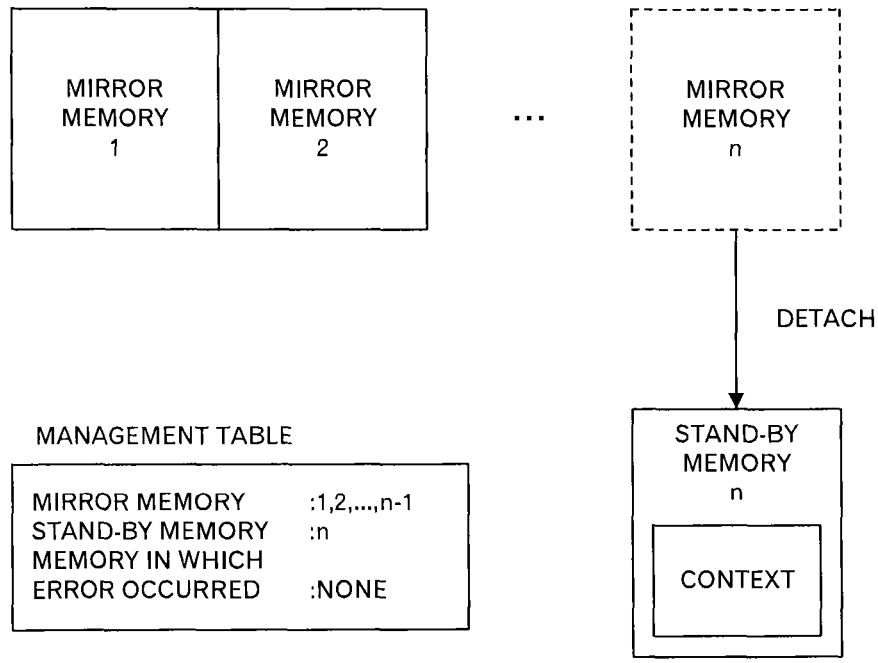
FIG. 5 is a diagram to explain switching from a mirror memory to a stand-by memory.

In the information processing apparatus 1, the main memory 100 is operated as the memory mirroring system (FIG. 4: step S11). In other words, for each of the mirror memories 1 to n, the same data is written in real time. Because the step S11 merely represents the state, the block of the step S11 in FIG. 4 is illustrated by a dotted line.

The OS 101 saves the context in any one of the mirror memories 1 to n, for example, periodically (step S13).

The memory controller 105 performs unmapping for an address range corresponding to the mirror memory in which the context was saved at the step S13 to detach as a stand-by memory, and stores a time stamp in that memory area. In other words, by making that memory area not referenced, data stored in that memory area is secured. According to this processing, that memory area is excluded from targets of the initialization at the restart. Therefore, data stored in that memory area is used as the snap shot.

After the step S15, the firmware 103 updates the management table 1031 (step S17). Identification information of the memory areas that are a mirror memories, identification information of the memory area that is a stand-by memory, and identification information of the memory area in which a memory error occurred are registered in the management table 1031. For example, when the mirror memory n is detached as the stand-by memory at the step S15, "n" is registered in the management table 1031 as the identification information of the memory area that is the stand-by memory.

Returning to the explanation of FIG. 4, the information processing [0036] apparatus 1 determines whether or not an end instruction of the memory mirroring is accepted from the user (step S19). When no end instruction is accepted (step S19: No route), the memory mirroring continues. Therefore, the processing returns to the step S11. On the other hand, when the end instruction is accepted (step S19: Yes route), the processing ends.

As described above, the data stored in the memory is not stored into a disk, however, the mirror memory is switched to the stand-by memory. Therefore, it is possible to reduce a time required to take the snap shot. Then, it does not take any time to take the snap shot. Therefore, an influence to the operation of the information processing apparatus 1 is lesser.

If the detaching of the memory is repeated, the number of stand-by memories gradually increases. Then, when the number of stand-by memories reaches a predetermined threshold, a memory area for which the oldest time stamp is stored may be returned to the mirror memory, and on behalf of one mirror memory, one stand-by memory may be detached.

Next, an operation performed when any abnormal condition occurred during the execution of the memory mirroring will be explained by using FIGS. 6 to 8.

Figure 6:
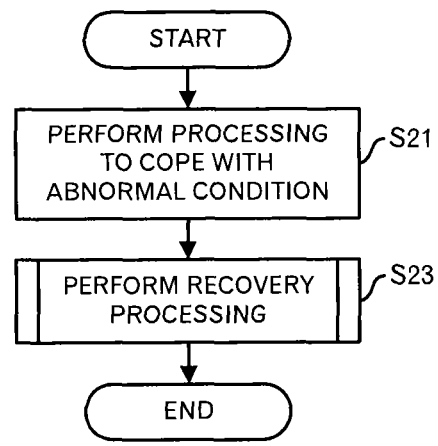
FIG. 6 is a diagram depicting a processing flow executed when any abnormal condition occurred during the execution of the memory mirroring.

First, when it is detected that any abnormal condition occurred in the information processing apparatus 1, the OS 101 performs a processing to cope with the abnormal condition (FIG. 6: step S21). For example, when a panic occurred or when any abnormal condition is detected by a watch dog timer, the processing of the step S21 is performed.

Then, the information processing apparatus 1 performs a recovery processing (step S23). The recovery processing will be explained by using FIG. 7.

When the reset of the hardware is performed after the abnormal condition occurred, the firmware 103 outputs a recovery instruction to the memory controller 105 through a processor controller 104. The recovery instruction includes identification information of the memory area that is the stand-by memory in the management table 1031. The memory controller 105 uses a time stamp stored in the memory area of the stand-by memory to identify the latest stand-by memory, and copies the memory contents in the identified stand-by memory to each mirror memory (FIG. 7: step S31).

The memory controller 105 switches the stand-by memory identified at the step S31 to the mirror memory (step S33).

After the step S33, the firmware 103 updates the management table 1031 (step S35). For example, in a case where any abnormal condition occurred in a state illustrated in FIG. 5, when the steps S31 and S33 are performed, a state as illustrated in FIG. 8 is obtained. In other words, "1 to n" is registered as the identification information of the memory areas that are the mirror memories in the management table 1031, and the identification information of the memory area that is the stand-by memory is not registered.

Figure 7:
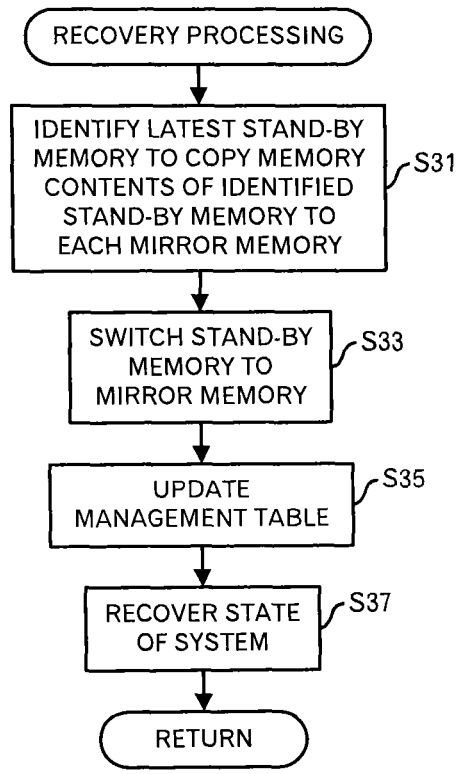
FIG. 7 is a diagram depicting a processing flow of a recovery processing.
Figure 8:
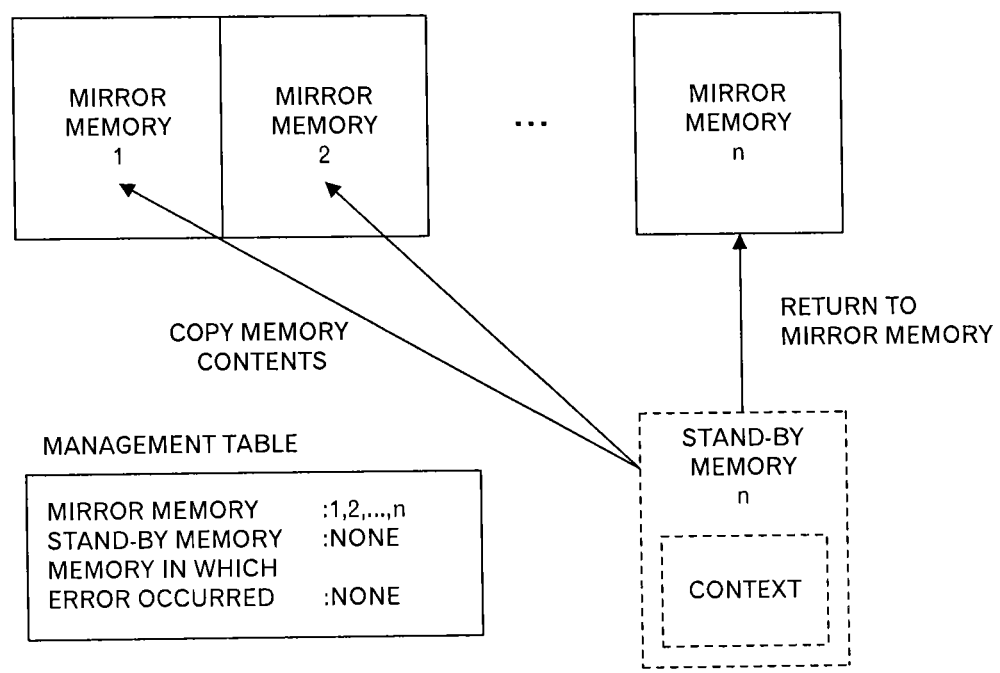
FIG. 8 is a diagram to explain switching from the stand-by memory to the mirror memory.

Returning to the explanation of FIG. 7, when the control returns to the OS 101, the OS 101 uses the memory contents of the stand-by memory identified at the step S31 and the context stored in the stand-by memory to recover the state of the system (step S37). Thus, the state of the system returns to the state before the abnormal condition occurred. Then, returning to FIG. 6, the processing ends.

As described above, the data is not transferred from the disk to the memory, however, the switching from the stand-by memory to the mirror memory is performed. Therefore, the recovery of the state of the system can be performed at high speed. Moreover, because the switching from the stand-by memory to the mirror memory is performed automatically when the reboot is performed after the abnormal condition occurred, it becomes possible for the user to operate the system without recognizing the maintenance state of the information processing apparatus 1. Furthermore, it is possible to simply recover the state of the system at the reset without complex control.

Next, an operation performed when a rest switch is pushed by a user during the execution of the memory mirroring will be explained by using FIG. 9.

Figure 9:
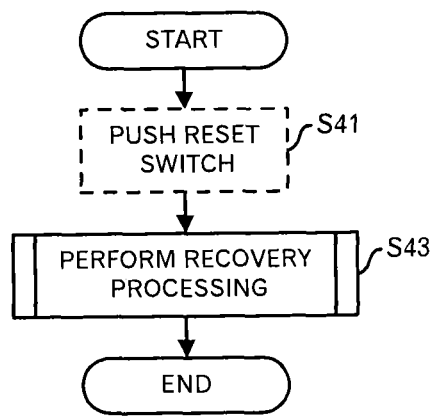
FIG. 9 is a diagram depicting a processing flow of a processing executed when a reset switch is pushed by a user during the execution of the memory mirroring.

For example, when the information processing apparatus 1 is hung up, the user pushes the reset switch of the information processing apparatus 1 (FIG. 9: step S41). The step S41 is not an operation of the information processing apparatus 1. Therefore, the block of the step S41 in FIG. 9 is illustrated by a dotted line.

The information processing apparatus 1 performs the recovery processing (step S43). The recovery processing is the same as that explained by using FIG. 7. Therefore, the explanation is omitted. Then, after the recovery processing, the processing ends.

Thus, a case where the reset is instructed by the user can be handled.

Next, an operation performed when any memory error occurred during the execution of the memory mirroring will be explained by using FIG. 10.

Figure 10:
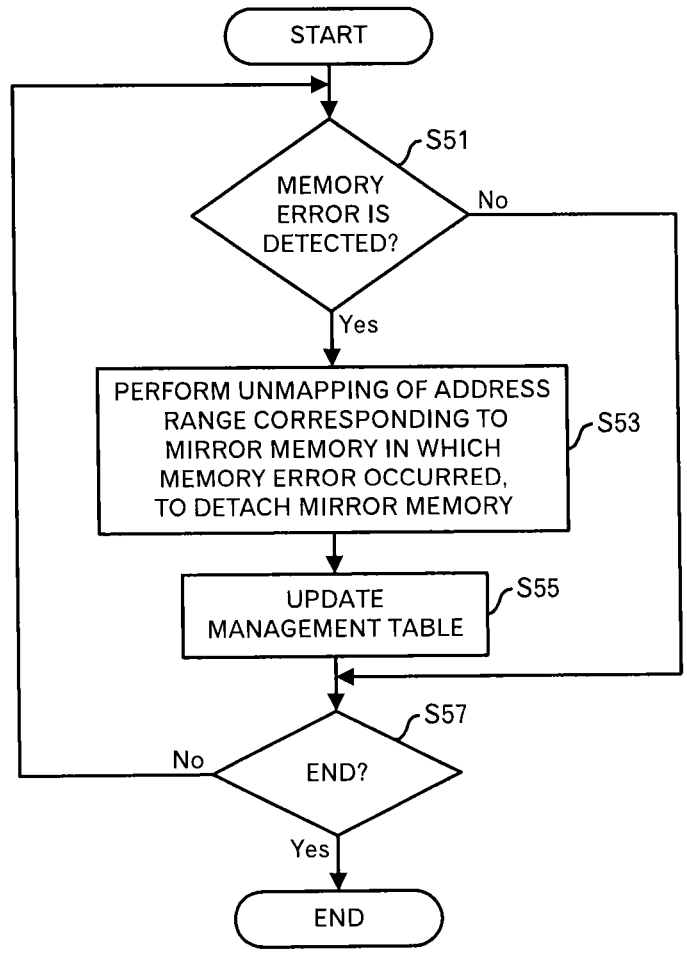
FIG. 10 is a diagram depicting a processing flow of a processing executed when a memory error occurred during the execution of the memory mirroring.

First, the error detector 106 determines whether or not a memory error is detected in the main memory 100 (FIG. 10: step S51). When no memory error is detected (step S51: No route), the processing shifts to step S57.

On the other hand, when the memory error is detected (step S51: Yes route), the error detector 106 outputs information concerning the error (e.g. identification information of the memory area in which the memory error occurred, information concerning a type of the memory error and the like) to the processor controller 104 and memory controller 105. A processing in the processor controller 104 after this is not a main portion in this embodiment. Therefore, the explanation for such a processing is omitted.

When the memory controller 105 receives the information concerning the error from the error detector 106, the memory controller 105 unmaps the address range corresponding to the mirror memory in which the memory error occurred to detach that mirror memory (step S53).

After the step S53, the firmware 103 updates the management table 1031 (step S55). More specifically, the identification information of the memory area in which the memory error occurred is registered in the management table 1031.

Then, the information processing apparatus 1 determines whether or not the detection of the memory error ends (step S57). For example, when stop of the information processing apparatus 1 is instructed by the user, it is determined that the detection of the memory error is terminated. When the detection of the memory error is not terminated (step S57: No route), the processing returns to step S51. On the other hand, when the detection of the memory error is terminated (step S57: Yes route), the processing ends.

By carrying out the aforementioned processing, even when the memory error occurred in a part of the memory areas, the operation can continue by using the remaining memory areas that are the mirror memories.

Next, an operation performed when the shutdown is normally performed during the memory mirroring being executed will be explained by using FIG. 11.

Figure 11:
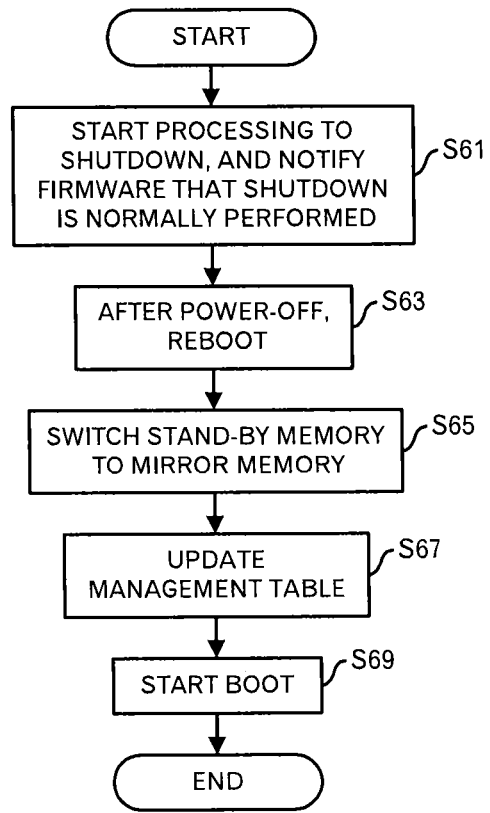
FIG. 11 is a diagram depicting a processing flow of a processing executed when shutdown is carried out normally during the execution of the memory mirroring.

When the shutdown of the information processing apparatus 1 is performed, the OS 101 starts a processing for the shutdown, and notifies the firmware 103 that the shutdown is normally performed (FIG. 11: step S61).

After the hardware of the information processing apparatus 1 is reset, the power of the information processing apparatus 1 becomes off once, and the information processing apparatus 1 automatically reboots after that (step S63).

Because the firmware 103 receives notification from the OS 101 at the step S61, the firmware 103 instructs the memory controller 105 to switch the stand-by memory to the mirror memory through the processor controller 104. In response to this, the memory controller 105 switches the memory area that is the stand-by memory to the mirror memory (step S65). Moreover, the memory controller 105 clears the contents of the main memory 100.

After the step S65, the firmware 103 updates the management table 1031 (step S67). More specifically, "1 to n" is registered as the identification information of the memory area that is the mirror memory in the management table 1031.

The processor controller 104 starts the boot (step S69). More specifically, data of the OS 101 is loaded onto the main memory 100 to activate the OS 101. Then, the processing ends.

By performing the aforementioned processing, when the state of the system is not recovered, the operation of the memory mirroring system can be started, as usual.

As described above, in this embodiment, the switching between the mirror memory and the stand-by memory is managed using the management table 1031. A state transition of the management table 1031 will be explained by using FIG. 12.

Figure 12:
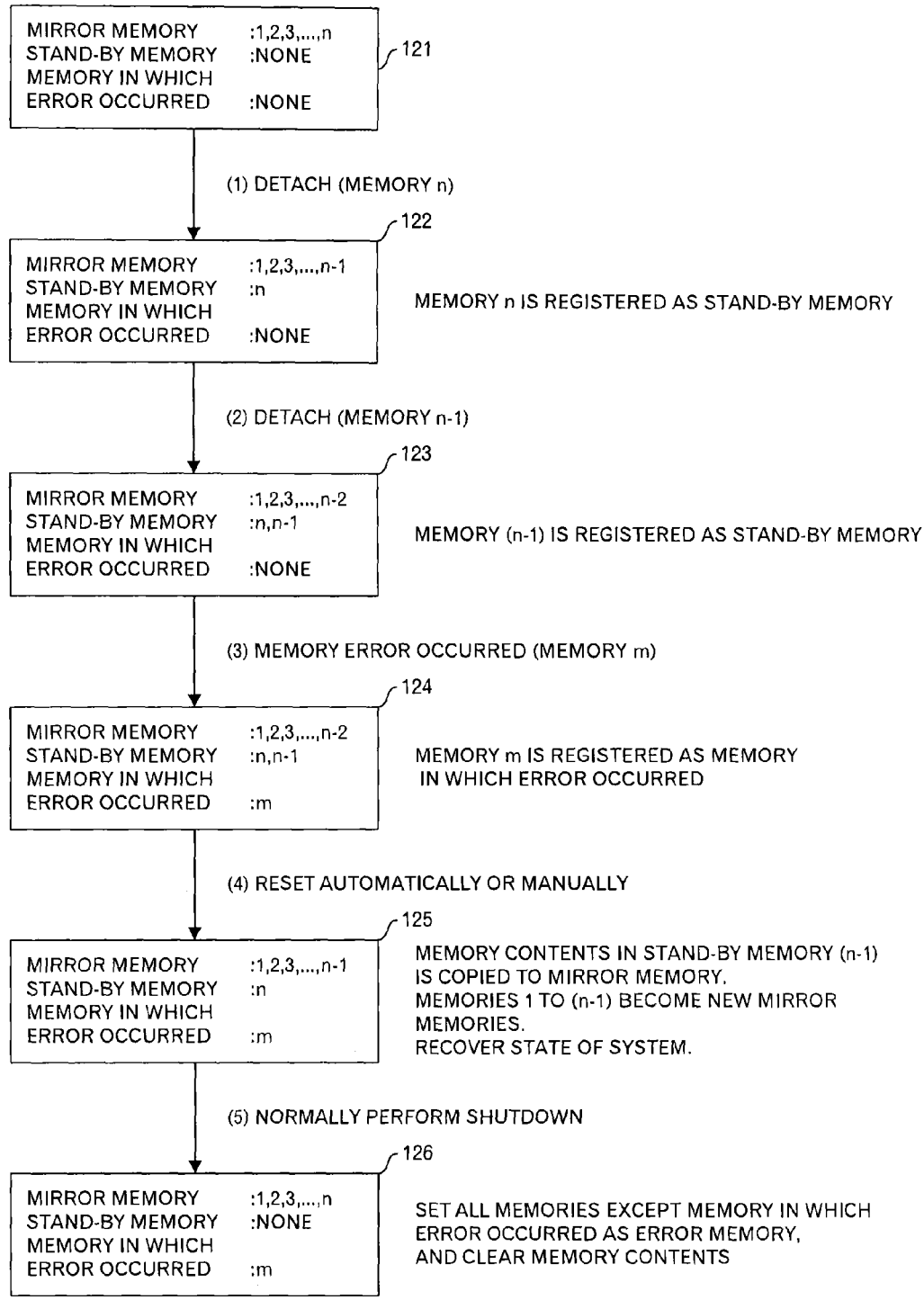
FIG. 12 is a diagram to explain state transitions of a management table.

It is presumed that an initial state of the management table 1031 is a state 121 as illustrated in FIG. 12. In this state, when the mirror memory n is switched to the stand-by memory, for example, the state of the management table 1031 shifts to a state 122 as illustrated in FIG. 12. In other words, a state is obtained that "1 to (n−1)" is registered as the identification information of the memory areas that are the mirror memories, and "n" is registered as the identification information of the memory area that is the stand-by memory.

When, in the state 122, the mirror memory (n−1) is further switched to the stand-by memory, the state of the management table 1031 changes to a state 123. In other words, a state is obtained that "1 to (n−2)" is registered as the identification information of the memory areas that are the mirror memories, and "n and (n−1)" is registered as the identification information of the memory areas that are the stand-by memories.

When, in the state 123, a memory error is detected in the mirror memory m, the state of the management table 1031 changes to a state 124. In other words, the state is registered that "1 to (n−2)" is registered as the identification information of the memory areas that are the mirror memories (however, except for m), and "n and (n−1)" is registered as the identification information of the memory areas that are the stand-by memories. and "m" is registered as the identification information of the memory area in which the memory error occurred.

When, in the state 124, the reset is automatically or manually performed, the state of the management table 1031 changes to the state 125. In other words, the state is obtained that "1 to (n−1)" is registered as the identification information of the memory areas that are the mirror memories, (however, except for m), and "n" is registered as the identification information of the memory areas that are the stand-by memories.

and "m" is registered as the identification information of the memory area in which the memory error occurred.

When, in the state 125, the shutdown is normally performed, the state of the management table 1031 changes to a state 126. In other words, the state is obtained that "1 to n" is registered as the identification information of the memory areas that are the mirror memories (however, except for "m"), and "m" is registered as the identification information of the memory area in which the memory error occurred.

Although the embodiment of this invention was explained above, the invention is not limited to the aforementioned embodiment. For example, the aforementioned functional block diagram of the information processing apparatus 1 does not always correspond to a program module configuration.

Moreover, the aforementioned table structures are mere examples, and may be changed. Furthermore, as for the processing flows, as long as the processing results do not change, an order of the steps may be changed. Moreover, the plural steps may be executed in parallel.

The aforementioned embodiment of this invention is outlined as follows:

An information processing method is executed by a computer and includes: (A) storing context representing a state of a processor in the computer into a certain area of plural areas included in a memory of the computer, wherein same data is stored in each of the plural areas by memory mirroring; (B) performing a setting to switch a type of the certain area from a type of an area for which the memory mirroring is performed to a type of an area for securing data (in other words, an area to which data is evacuated); and (C) upon detecting that reset of the computer was performed, recovering, the state of the processor by using data stored in the certain area (i.e. the area for securing data).

Thus, there is no need to transfer data from a disk to a memory at the recovery. Therefore, the recovery can be carried out at high speed. Moreover, the contents of the memory is not stored into the disk, therefore, it becomes possible to shorten the time required for securing data (or evacuating data).

Moreover, the aforementioned performing may include (b1) storing a time stamp in the certain area (i.e. the area for securing data). Then, the aforementioned storing and the performing may be executed at plural timings. Furthermore, the aforementioned recovering may include (c1) identifying data to be used for the recovering, based on the time stamp stored in the certain area (i.e. the area for securing data).

Thus, it becomes possible to use appropriate data for the recovery, for example, using the latest data to recover the state of the computer.

Moreover, the information processing method may further include: (D) upon detecting that an error occurred in the memory, performing a setting to exclude an area in which the error occurred from areas for which the memory mirroring is performed.

Thus, even when any error occurred in a part of the areas, the memory mirroring can continue.

In addition, the aforementioned performing may include (b2) unmapping an address range corresponding to the certain area (i.e. area storing the context).

Thus, because the certain area is not initialized at the reset, it is possible that the data is secured.

Furthermore, the aforementioned context may include information of a register in the processor. Thus, the state of the processor can be recovered.

Moreover, the aforementioned reset may be performed upon detecting that a reset switch is pushed by a user or upon that an abnormal condition is detected in the computer.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing method, comprising:
    storing, by using a computer, context representing a state of a processor in the computer into a certain memory area of a plurality of memory areas included in a memory of the computer, wherein same data is stored in each of the plurality of memory areas in real time by mirroring;
    performing, by using the computer, a setting for an address range of the certain memory area so as to switch a type of the certain memory area from a type of a memory area for which the mirroring is performed to a type of a memory area for securing data; and
    upon detecting that reset of the computer was performed, recovering, by using the computer, the state of the processor by using data stored in the certain memory area.

2. The information processing method as set forth in claim 1, wherein
    the performing comprises storing a time stamp in the certain area,
    the storing and the performing are executed at plural timings, and
    the recovering comprises identifying data to be used for the recovering, based on the time stamp stored in the certain memory area.

3. The information processing method as set forth in claim 1, further comprising:
    upon detecting that an error occurred in the memory, performing a setting to exclude an area in which the error occurred from areas for which the mirroring is performed.

4. The information processing method as set forth in claim 1, wherein the performing comprises unmapping an address range corresponding to the certain memory area.

5. The information processing method as set forth in claim 1, wherein the context includes information of a register in the processor.

6. The information processing method as set forth in claim 1, wherein the reset is performed upon detecting that a reset switch is pushed by a user or upon detecting an abnormal condition in the computer.

7. An information processing apparatus, comprising:
    a memory having a plurality of memory areas each of which stores same data written in real time by mirroring;
    a processor; and
    circuitry configured to
        store context representing a state of the processor into a certain memory area of the plurality of memory areas; and perform a setting for an address range of the certain memory area so as to switch a type of the certain memory area from a type of a memory area for which the mirroring is performed to a type of a memory area for securing data, and wherein, upon detecting that reset of the information processing apparatus was performed, the circuitry recovers the state of the processor by using data stored in the certain memory area.

8. A computer-readable, non-transitory storage medium storing a program for causing a computer to execute a process, the process comprising:

storing context representing a state of a processor in the computer into a certain memory area of a plurality of memory areas included in a memory of the computer, wherein same data is stored in each of the plurality of memory areas in real time by mirroring;

performing a setting for an address range of the certain memory area so as to switch a type of the certain memory area from a type of a memory area for which the mirroring is performed to a type of a memory area for securing data; and upon detecting that reset of the computer was performed, recovering the state of the processor by using data stored in the certain memory area.

* * * * *